United States Patent [19]

Teramachi

[11] 4,165,195
[45] Aug. 21, 1979

[54] RECIRCULATING BALL BEARING SPLINE JOINT

[76] Inventor: Hiroshi Teramachi, 2-34-8, Higashi-Tamagawa, Setagaya-ku, Tokyo, Japan, 158

[21] Appl. No.: 924,893

[22] Filed: Jul. 17, 1978

[30] Foreign Application Priority Data

Sep. 6, 1977 [JP] Japan .................. 52-118944[U]

[51] Int. Cl.² .................. B25G 3/28; F16B 3/00; F16B 7/00
[52] U.S. Cl. .................. 403/359; 308/6 C
[58] Field of Search .................. 403/359, 57, 58; 64/9 A; 308/6 R, 6 C

[56] References Cited

U.S. PATENT DOCUMENTS

| | | | |
|---|---|---|---|
| 2,908,152 | 10/1959 | Anderson | 308/6 C |
| 3,304,745 | 2/1967 | King et al. | 308/6 C |
| 3,318,109 | 5/1967 | Ressler et al. | 308/6 C |
| 3,436,132 | 4/1969 | Wiesler | 308/6 C |
| 3,800,558 | 4/1974 | Buthe et al. | 308/6 C |
| 3,897,982 | 8/1975 | Teramachi | 308/6 C |

*Primary Examiner*—Wayne L. Shedd
*Attorney, Agent, or Firm*—George B. Oujevolk

[57] ABSTRACT

A unit composed of a ball spline and a shaft having a polygonal cross section, the ball spline including an outer sleeve formed in its inner peripheral surface with ball-circulating grooves in vertically or horizontally symmetrical disposition, two separated holders each having an angle slightly larger than an angle α when assembled in the outer sleeve and holding a desired number of balls, the holders assembled in the outer sleeve with being inflected inwardly, and a pair of holder retainers fitted to the opposite opening ends of the outer sleeve; and the shaft formed with four ball-circulating grooves in the opposite sides of its opposite two sides and inserted in the ball spline.

5 Claims, 5 Drawing Figures

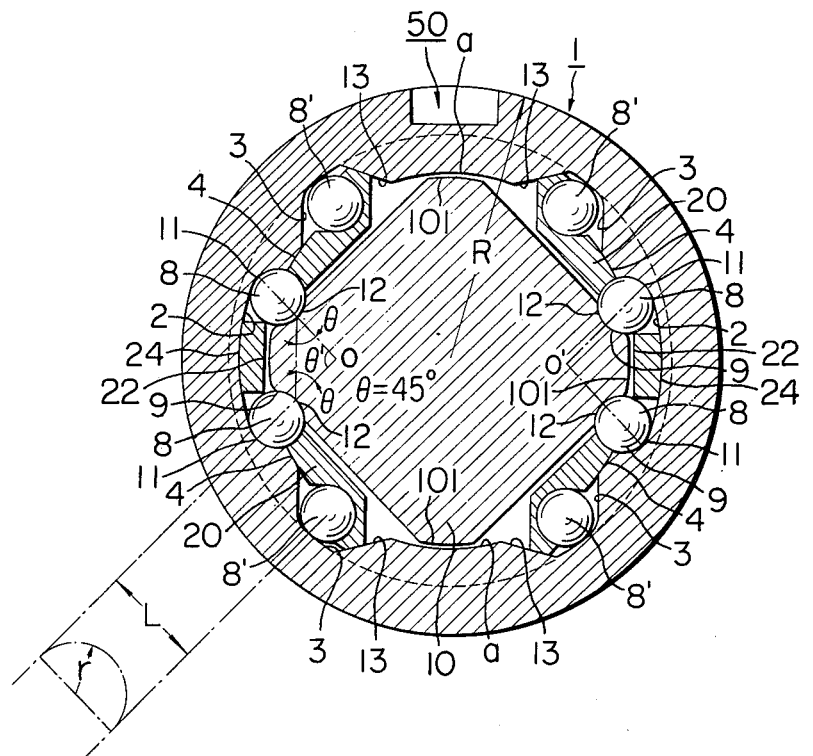
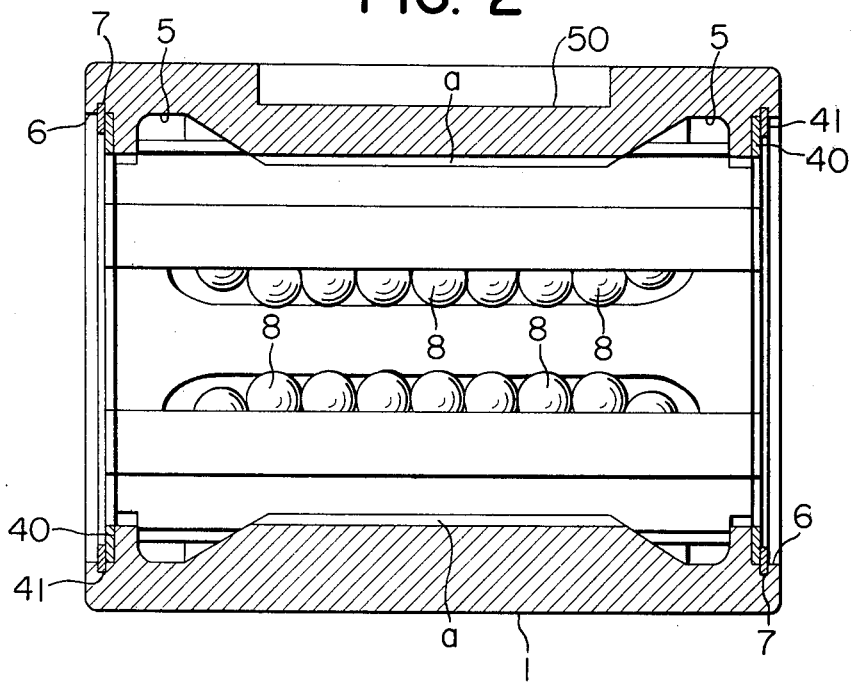

RECIRCULATING BALL BEARING SPLINE JOINT

BACKGROUND OF THE INVENTION

1. Field of the Invention

The invention relates to a unit composed of a ball spline and a shaft with a polygonal cross section, the ball spline including an outer sleeve formed in its inner peripheral surface with ball-circulating grooves in a vertically or horizontally symmetric disposition, a pair of holders each having a vertically or horizontally symmetric structure and an angle slightly larger than an angle α when assembled in the outer sleeve, the holders holding a desired number of balls and assembled in the outer sleeve with being inflected inwardly, and a pair of holder retainers fitted to the opposite opening ends of the outer sleeve; and the shaft formed with four ball-circulating grooves in the opposite sides of its opposite two sides and inserted in the ball spline.

2. Description of the Prior Art

There are two types in normally used ball splines for different diameter spline shafts, one referred to as a casing type having balls directly assembled in a body and the other a cage type employing a holder. Cageless type ball splines are also known which eliminate the need for any cage so as to reduce the number of required parts and thus reduce the cost. However, such cageless type ball splines have a tendency of the balls to fall out of the body when assembled or disassembled, resulting in difficulties to check or repair. Another type ball splines are known which include a holder for guiding balls. However, they are disadvantageous in their poor ability to smoothly circulate the balls with a large ball rolling resistance due to the less radius of gyration of the balls running between load and unload regions and also in their difficulties encountered when assembled.

SUMMARY OF THE INVENTION

The primary object of the present invention is to provide a unit of a ball spline and a shaft having a polygonal cross section, the ball spline including an outer sleeve formed in its inner peripheral surface with ball-circulating grooves in vertically or horizontally symmetrical disposition, two separated holders each having an angle slightly larger than an angle α when assembled in the outer sleeve and holding a desired number of balls, the holders assembled in the outer sleeve with being inflected inwardly, and a pair of holder retainers fitted to the opposite opening ends of the outer sleeve; and the shaft formed with four ball-circulating grooves in the opposite sides of its opposite two sides and inserted in the ball spline.

A second object of the present invention is to provide a unit of a ball spline and a shaft having a polygonal cross section with the features noted in the primary object, in which the ball circulating grooves include first axially extending parallel ball grooves 2, 2 formed in the inner peripheral surface of the outer sleeve and facing each other for receiving loaded balls, second axially extending parallel ball grooves spaced circumferentially around the inner peripheral surface of the outer sleeve a distance L away from the first ball grooves 2, 2 for receiving unloaded balls, and escape portions formed in the opposite end portions of the outer sleeve for connecting the first and second ball grooves.

A third object of the present invention is to provide a unit of a ball spline and a shaft having a polygonal cross section with the features noted in the primary object, in which the holders each has its inner surface including a center vertical surface 22, upper and lower vertical surfaces 21, 21, and slant surfaces 23 connecting the center vertical surface 22 to the upper vertical surface 21 and the center vertical surface 22 to the lower vertical surface 21, each of the holders having its outer surface including a center curved surface 24 with the same curvature as the first ball groove 2 bottom of the outer sleeve 1, upper and lower curved surfaces 25, intermediate curved surfaces 26 with the same curvature as the land surface 4 of the outer sleeve 1, slant surfaces 27 connecting the upper curved surface 25 to the intermediate curved surface 26 and the lower curved surface 25 to the intermediate curved surface 26, and slant surfaces 28 formed in the upper and lower portion of the holder, each of the holders formed with endless ball circulating recesses 29, 29 in the portions corresponding to the first and second ball grooves and the escape portions 5 formed in the inner peripheral surface of the outer sleeve 1, and the endless ball circulating recesses 29, 29 formed with elongated holes 30, 30.

A fourth object of the present invention is to provide a unit of a ball spline and a shaft having a polygonal cross section with the features noted in the primary object, in which the shaft has a quadrilateral cross section with its four corners cut such that the cut curved or linear small sides 101, 101 are spaced away from the center of the shaft a distance less than $\frac{3}{4}$ times the outer radius of the outer sleeve, and the shaft formed with third axially extending parallel ball grooves in the opposite sides of the cut opposite two sides 101, 101 such that the lines extending through the points 11, 11 and 12, 12 at which balls contact with the first groove of the outer sleeve and the third ball grooves 9, 9 intersect at right angles.

BRIEF DESCRIPTION OF THE DRAWINGS

FIG. 1 is a sectional view of the unit of a ball spline and a shaft with a polygonal cross section made in accordance with the present invention;

FIG. 2 is a longitudinal sectional elevational view showing the essential part of the ball spline;

DETAILED DESCRIPTION OF THE PREFERRED EMBODIMENT

Figure 3:
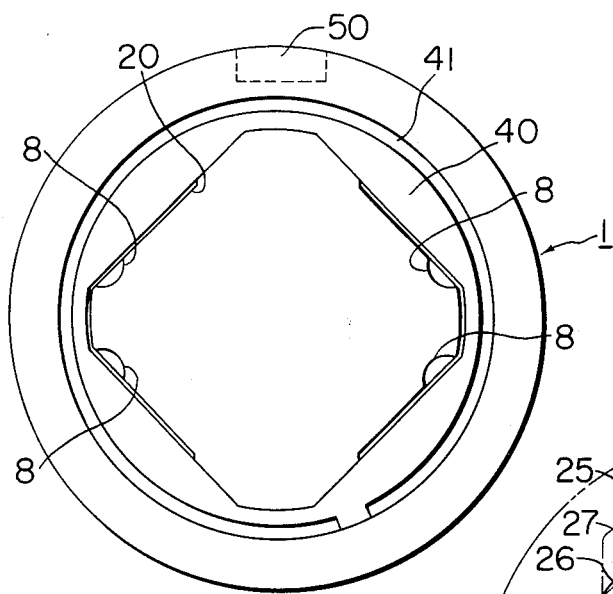
FIG. 3 is a side view showing the essential part of the ball spline.
Figure 4A:
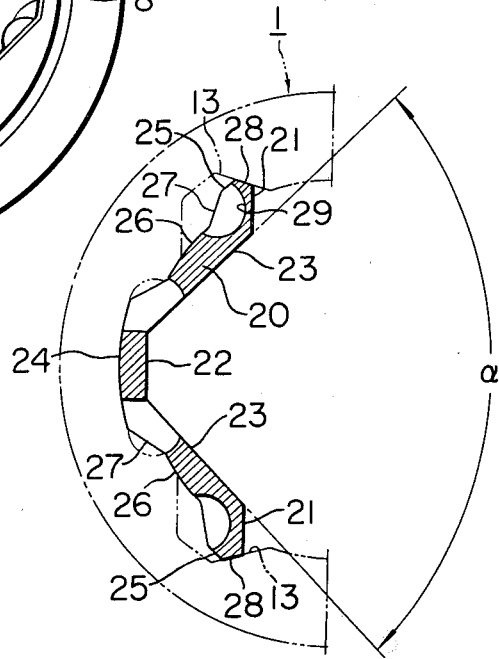
FIG. 4a is a plan view of the holder assembled in the ball spline.
Figure 4B:
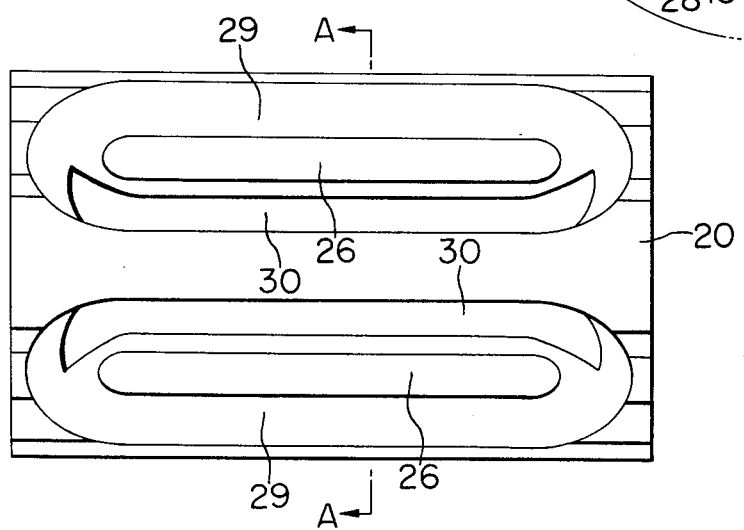
FIG. 4B is a sectional view taken along the line A—A of FIG. 4a showing the holder assembled in the outer sleeve.

Referring now to the accompanying drawings, the numeral 1 designates a hollow cylindrical outer sleeve having an outer radius R and an inner radius about $\frac{3}{4}$R. The outer sleeve 1 has its inner peripheral surface a formed with two first axially extending parallel ball grooves 2, 2 facing each other for receiving a desired number of loaded balls and also with second axially extending parallel ball grooves 3, 3 in the opposite sides of each of the first ball grooves 2 for receiving unloaded balls which are spaced circumferentially around the inner peripheral surface of the outer sleeve a distance L away from the first ball groove 2 so as to form axially extending parallel lands 4, 4 in the opposite sides of each of the first ball grooves 2, 2. The outer sleeve 1 has its inner surface opposite end portions formed with escape portions 5, 5 which form ball-circulating grooves along with the first and second ball grooves. In the opposite ends of the outer sleeve 1 there are formed holder retaining stepped portions 6, 6 and concaval recesses 7, 7 in which clips are fitted.

The first ball grooves are formed such that the lines extending through the points 11, 11 and 12, 12 at which balls contact with the first ball groove of the outer sleeve and third ball grooves 9, 9 formed in a shaft 10 intersect at right angles.

The shaft has a quadrilateral cross section with its four corners cut such that the cut curved or linear small sides 101, 101 are spaced away from the center of the shaft a distance less than ⅔ times the outer radius R of the outer sleeve. The shaft formed with third axially extending parallel ball grooves 9, 9 in the opposite sides of the cut opposite two small sides 101, 101 such that the lines extending through the points 11, 11 and 12, 12 at which balls contact with the first groove of the outer sleeve and the third ball grooves 9, 9 intersect at right angles. The outer sleeve 1 has its inner surface formed with slant surfaces 13 connecting the surfaces a and the second ball grooves 3 as shown in FIG. 1.

The numeral 20 indicates a pair of holders formed of a plastic material such as plastic hard rubber, a powder metallurgy such as sintered alloys, or die-casted alloy and having a horizontally symmetric structure. Each of the holders 20 has its inner surface including a center vertical surface 22, upper and lower vertical surfaces 21, 21, and wide slant surfaces 23, 23 connecting the center vertical surface 22 to the upper vertical surface 21 and the center vertical surface 22 to the lower vertical surface 21. The holder 20 is formed such that the angle made by the slant surfaces 23, 23 is at right angles when assembled in the outer sleeve 1. The holder 20 has its outer surface including a center curved surface 24 with the same curvature as the first ball groove 2 bottom of the outer sleeve 1, upper and lower curved surfaces 25, 25, intermediate curved surfaces 26, 26 with the same curvature as the land surface 4 of the outer sleeve 1, slant surfaces 27, 27 connecting the upper curved surface 25 to the intermediate curved surface 26 and the lower curved surface 25 to the intermediate curved surface 26, and slant surfaces 28 formed in the upper and lower portion of the holder. The holder is formed with endless ball circulating recesses 29, 29 in the portions corresponding to the first and second ball grooves and the escape portions 5 formed in the inner peripheral surface of the outer sleeve 1, and the endless ball circulating recesses 29, 29 are formed with elongated holes 30, 30.

The holders 20 and the shaft 10 are assembled in the outer sleeve 1 in the following order: First, the balls 8 and 8' are charged into the endless grooves 29, 29 of one of the holders 20 along with grease, and the holder 20 is then assembled in the outer sleeve 1 by outwardly pushing the holder 20 with pressing the upper and lower slant surfaces 28, 28 against the respective slant surfaces 13, 13 of the outer sleeve 1 until the center curved surface 24 of the holder 20 comes into contact with the bottom of the first ball groove 2 of the outer sleeve 1 so that the upper and lower slant surfaces 28, 28 can be fitted against the slant surfaces 13, 13 of the outer sleeve 1 to hold the holder 20 in place. The other holder 20 is then assembled in the outer sleeve 1 in the same manner as done the one holder 20. Thereafter, the holder retainers 40, 40 are fitted in the holder retaining stepped portions 6, 6 and then the clips 41, 41 are fitted in the recesses 7, 7. After the ball spline is completely assembled, the shaft 10 having a polygonal cross section and having four third ball grooves is inserted into the assembled ball spline.

In the unit of the ball spline and the shaft having a polygonal cross sectional which has two pairs of first and second ball grooves formed in the inner peripheral surface of the outer sleeve, there is a larger distance L between loaded and unloaded balls as compared with conventional ball splines. This permits to provide an increased radiul of gyration of the balls running between load and unload regions, whereby the balls can smoothly circulate through the ball circulating grooves with a less ball rolling resistance. Since the outer sleeve has upper and lower thick wall portions, a spline 50 can be formed in one of these portions without any problem in strength. Also, since the holder is separated into two parts and made of a plastic material, a powder metallurgy, or a die-casted alloy, it is possible to make the holder to have an angle slightly larger than an angle α when assembled in the outer sleeve so that the upper and lower slant surfaces 28 can be pressed against the slant surfaces 13 of the outer sleeve 1 to securely hold the holder in place when the holder is pushed to bring the intermediate curved surfaces 26 and the center curved surface 24 into contact with the land surfaces 4 and the curved surfaces of the first ball grooves 2. In addition, the arrangement of the shaft having a quadrilateral cross section with its four corners cut such that the cut curved or linear small sides are spaced away from the center of the shaft a distance less than ⅔ times the outer radius of the outer sleeve and formed with four axially extending parallel ball grooves in the opposite sides of the cut opposite two sides is easy to produce and low in cost.

Although the loaded balls and unloaded balls are designated by different reference numerals, it is to be understood, of course, that these balls are of the same kind.

What is claimed is:

1. A unit of a ball spline and a shaft having a polygonal cross section, the ball spline including an outer sleeve formed in its inner peripheral surface with ball-circulating grooves in vertically or horizontally symmetrical disposition, two separated holders each having an angle slightly larger than an angle α when assembled in the outer sleeve and holding a desired number of balls, the holders assembled in the outer sleeve with being inflected inwardly, and a pair of holder retainers fitted to the opposite opening ends of the outer sleeve; and the shaft formed with four ball-circulating grooves in the opposite sides of its opposite two sides and inserted in the ball spline.

2. A unit as set forth in claim 1, wherein the ball circulating grooves include first axially extending parallel ball grooves formed in the inner peripheral surface of the outer sleeve and facing each other for receiving loaded balls, second axially extending parallel ball grooves spaced circumferentially around the inner peripheral surface of the outer sleeve a distance away from the first ball grooves for receiving unloaded balls, and escape portions formed in the opposite end portions of the outer sleeve for connecting the first and second ball grooves.

3. A unit as set forth in claim 1, wherein the holder each has its inner surface including a center vertical surface, upper and lower vertical surfaces, and slant surfaces connecting the center vertical surface to the upper vertical surface and the center vertical surface to the lower vertical surface, each of the holders having its outer surface including a center curved surface with the same curvature as the first ball groove bottom of the outer sleeve, upper and lower curved surface, intermediate curved surfaces with the same curvature as the land surface of the outer sleeve, slant surfaces connecting the upper curved surface to the intermediate curved surface and the lower curved surface to the intermediate curved surface, and slant surfaces formed in the upper and lower portions of the holder, each of the holders formed with endless ball-circulating recesses in the portions corresponding to the first and second ball grooves and the escape portions formed in the inner peripheral surface of the outer sleeve, and the endless ball-circulating recesses formed with elongated holes.

4. A unit as set forth in claim 1, wherein the shaft has a quadrilateral cross section with its four corners cut such that the cut curved or linear small sides are spaced away from the center of the shaft a distance less than $\frac{2}{3}$ times the outer radius of the outer sleeve, and the shaft formed with third axially extending parallel ball grooves in the opposite sides of the cut opposite two sides such that the lines extending through the points at which balls contact with the first groove of the outer sleeve and the third ball grooves intersect at right angles.

5. A unit of a ball spline and a shaft with a polygonal cross section, the ball spline including an outer sleeve, a pair of holders, and a desired number of balls, the outer sleeve formed with first axially extending parallel ball grooves facing each other, second axially extending parallel ball grooves spaced circumferentially around the inner peripheral surface of the outer sleeve a distance away from the first ball grooves, and escape portions and clip receiving grooves formed in the opposite end portions of the outer sleeve for connecting the first and second ball grooves, the holder each having its inner surface including a center vertical surface, upper and lower vertical surfaces, and slant surfaces connecting the center vertical surface to the upper vertical surface and the center vertical surface to the lower vertical surface, each of the holders having its outer surface including a center curved surface with the same curvature as the first ball groove bottom of the outer sleeve, upper and lower curved surface, intermediate curved surfaces with the same curvature as the land surface of the outer sleeve, slant surfaces connecting the upper curved surface to the intermediate curved surface and the lower curved surface to the intermediate curved surface, and slant surfaces formed in the upper and lower portions of the holder, each of the holders formed with endless ball circulating recesses in the portions corresponding to the first and second ball grooves and the escape portions formed in the inner peripheral surface of the outer sleeve, and the endless ball circulating recesses formed with elongated holes, the balls charged between the outer sleeve and the holders, and clips 41 fitted in the grooves; and the shaft formed with four ball-circulating grooves in the opposite sides of its opposite two sides and inserted in the ball spline.

* * * * *